(No Model.) 2 Sheets—Sheet 2.
E. C. CARTER.
COUNTERBALANCE FOR CHUTES FOR ORE DOCKS.
No. 558,774. Patented Apr. 21, 1896.
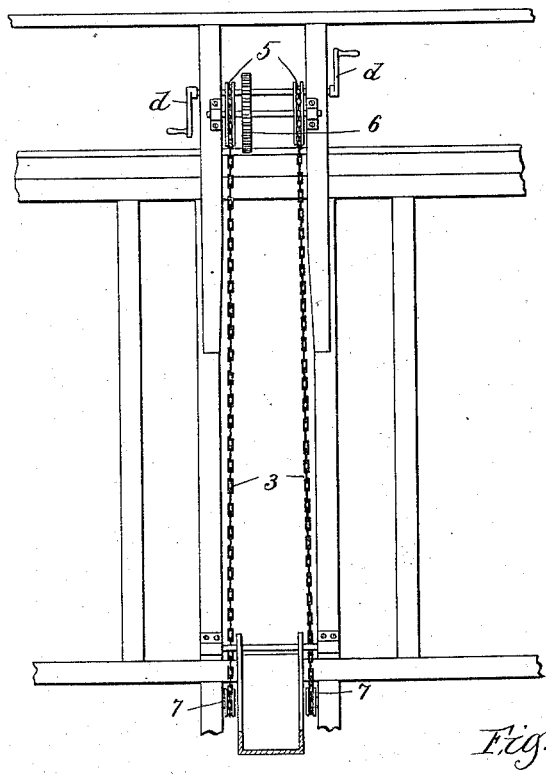
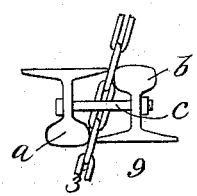
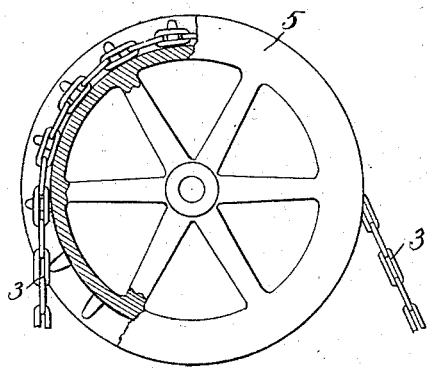
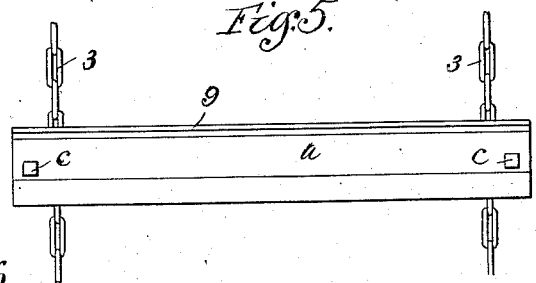
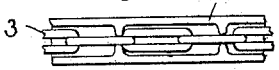
Witnesses.
Wm. M. Rheem.
Wm. F. Henning.
Inventor
Edw. C. Carter
by Wm. S. Bates
Atty.

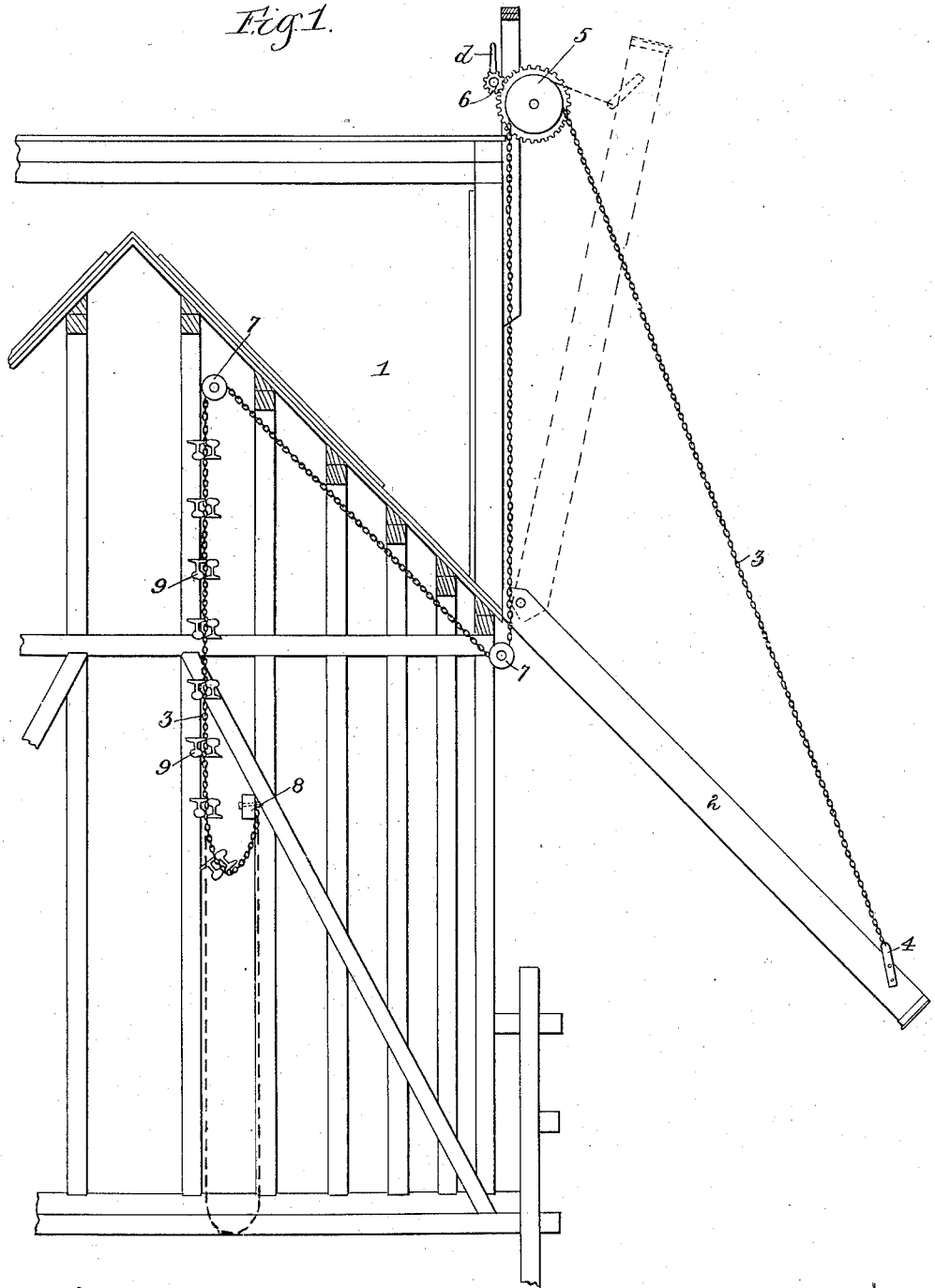

UNITED STATES PATENT OFFICE.

EDWARD C. CARTER, OF EVANSTON, ILLINOIS.

COUNTERBALANCE FOR CHUTES FOR ORE-DOCKS.

SPECIFICATION forming part of Letters Patent No. 558,774, dated April 21, 1896.

Application filed January 8, 1896. Serial No. 574,698. (No model.)

*To all whom it may concern:*

Be it known that I, EDWARD C. CARTER, of Evanston, Illinois, have invented certain new and useful Improvements in Counterbalances for Chutes for Ore-Docks and Similar Structures, whereof the following is a specification.

My invention is more particularly intended for the chutes which are used on ore-docks for discharging the contents of the ore-bins into vessels.

It consists in combining with the pivoted chute one or more chains attached at one end to the chute, passing thence over what I term "pocket-wheels," which are connected with and controlled by a windlass and attached at the other end to a suitable fixed point and provided near this fixed point with a series of weights to counterbalance the chute.

The invention also consists in certain other matters, all of which will appear in the claims at the end hereof.

The object of the invention is to give control of the chute in its motions up and down and to cause it to be more or less perfectly counterbalanced at all points in its movement, and also to cheapen and simplify the construction thereof.

In the accompanying drawings I have represented my invention in what I consider its best form.

Figure 1 is a side view, partly in section, showing an ore-bin with the chute down or in its discharging position. Fig. 2 is a face view of the upper part of the structure. Fig. 3 is a side view, partly in section, of one of the pocket-wheels. Fig. 4 is an end view of one of the counterbalance-weights. Fig. 5 is a side view of the same, and Fig. 6 is a top view of part of a pocket-wheel.

In the drawings, 1 represents an ore-bin.

2 represents the chute, pivoted in the usual manner to the bin, so that it can rise to the position shown in dotted lines, Fig. 1, or can descend to the position shown in full lines to discharge the material in the pocket.

3 represents two chains fastened to the chute near its free end, as at 4, passing thence over pocket-wheels 5, which are connected to and controlled by a windlass 6, thence over suitable idlers or direction-pulleys 7, and attached at its other end to a fixed part of the framing, as at 8.

9 are a series of counterweights attached at intervals to the chain toward its fixed end 8, so that as the chute rises to the position shown in dotted lines in Fig. 1 the chain will assume the position also shown in dotted lines, and more or less of the counterweights will be suspended from the point 8, thus reducing the counterbalance of the chute as its pull on the chain is reduced.

The counterweights 9 I make of pieces of railroad-rails, each weight being composed of two such pieces placed in reversed position, as shown—that is, with head to flange, with the chains between them and with bolts to fasten them together, as shown in Figs. 4 and 5, in which $a$ represents one rail, $b$ the other, and $c$ the fastening-bolts. The windlass 6 may be operated by cranks $d$, as shown in Fig. 2.

The pocket-wheels 5 are pulleys with pockets in their peripheries to receive the links of the chains, as shown in Fig. 3, and thus engage the chains, so that turning the pocket-wheels by means of the windlass will move the chains, and thereby actuate and control the chute.

I claim—

1. In combination with a pivoted chute, two continuous hoisting-chains each connected at one end to the chute and at its opposite end to a fixed point of the framing; two pocket-wheels over which said chains pass; a windlass to which said pocket-wheels are connected, and by which they are controlled; and a series of weights secured to and connecting said chains, substantially as set forth.

2. In combination with a pivoted chute, two continuous hoisting-chains each connected at one end to the chute, and at its opposite end to a fixed point on the framing; two pocket-wheels secured to the upper portion of the framing and over which the chains pass; a windlass for controlling said pocket-wheels; idler-pulleys located a slight distance below the pivot of the chute, a second pair of idlers located in rear and above the first set of idlers, and a series of weights secured to and connecting the chains, below said second set of idlers, substantially as shown and described.

EDWD. C. CARTER.

Witnesses:
WM. S. BATES,
JULIA M. BRISTOL.